United States Patent [19]

Sutton

[11] Patent Number: 4,503,742
[45] Date of Patent: Mar. 12, 1985

[54] PRECISION SAW

[76] Inventor: Bill E. Sutton, 1802 Boswell, Branson, Mo. 65616

[21] Appl. No.: 446,727

[22] Filed: Dec. 3, 1982

[51] Int. Cl.³ ............................................. B23D 49/00
[52] U.S. Cl. ........................................ 83/781; 83/782; 83/783; 83/581.1
[58] Field of Search .................................. 83/782–786, 83/581.1, 662, 781

[56] References Cited

U.S. PATENT DOCUMENTS

| Re. 7,726 | 6/1877 | Plummer | 83/782 |
| 118,498 | 8/1871 | Wallace | 83/782 |
| 189,461 | 4/1877 | House | 83/782 |
| 220,705 | 10/1879 | Dearborn | 83/782 |
| 2,692,622 | 10/1954 | Heese | 83/782 |
| 2,721,587 | 10/1955 | Dremel | 83/782 |
| 2,753,898 | 7/1956 | MacFarland | 83/782 X |

FOREIGN PATENT DOCUMENTS

| 533006 | 11/1956 | Canada | 83/777 |
| 153713 | 7/1904 | Fed. Rep. of Germany | 83/779 |
| 572386 | 2/1976 | Switzerland | 83/783 |

*Primary Examiner*—James M. Meister
*Attorney, Agent, or Firm*—Kokjer, Kircher, Bradley, Wharton, Bowman & Johnson

[57] ABSTRACT

A precision saw is the subject of the present invention. A framework mounts a planar member and presents a work surface having an opening for receiving a saw blade. A C-member is coupled with the framework and has upper and lower arms extending parallel to and above and below the work surface. The planar member is mounted for pivotal movement by a pivot rod positioned at a point in a horizontal plane located substantially at the center of the bight of the member. A saw blade extends between the upper and lower arms for cutting a work piece and a drive system is provided for moving the C-member in a generally vertical plane about the single pivot point.

2 Claims, 6 Drawing Figures

PRECISION SAW

This invention relates generally to woodworking saws and, more particularly, to a precision jig or scroll saws having improved operating characteristics.

Precision saws are well known in the woodworking industry and are widely used for sawing hardwoods as well as materials such as plastics, brass, aluminum, precious metals, copper, rubber and graphite. Intricate decorative and functional patterns may be cut using this type of equipment.

A typical saw of the prior art is sold under the trademark Hegner POLYMAX-3 and is distributed in the United States from its German manufacturer by AMI, Ltd. of Wilmington, Del. This saw is constructed with upper and lower arms which extend parallel to a work table and mount a saw blade. Each of the two arms is pivoted about a stationary mount and the two arms are held together by a tension spring located behind the pivot points. One of the arms is directly driven by a motor and the other arm moves in response to movement of the first arm. Because of the existence of two pivot points, one for each arm respectively, it is possible that the arms will not move in perfect synchronization, thus causing some unnecessary tension and fatigue on the cutting blade. Periodically, adjustment of the tensioning spring which holds the two arms together must be made. The fact that there are two pivot points causes increased vibration in the overall unit.

The present invention overcomes the disadvantages of the aforedescribed construction by providing a precision saw wherein a C-member having upper and lower arms mounts the cutting blade. This C-member is mounted for pivotal movement about only a single pivot axis located at approximately the center of the bight of the C-member.

It is, therefore, a primary object of the present invention to provide an improved precision saw which will give a smoother, cleaner cut as a result of a unique C-member construction which eliminates one pivot point and assures that both the upper and lower arms of the C-member will always move in perfect synchronization.

A further objective of the invention is to provide an improved precision saw where there is less of a tendency to break saw blades because of less fatigue on the blades and because the arms mounting the blade are integral and always move in perfect synchronization.

Another one of the aims of my invention is to provide an improved precision saw which eliminates the need for a tension spring which must be adjusted to control the tension on the arms that mount the cutting blade and instead provides for these arms to be integral thus always assuring proper tension.

A further one of my objects in the present invention is to provide an improved precision saw having only a single pivot point for a C-member which mounts the upper and lower arms of the saw thus reducing the amount of pivoting action and the attendant vibration.

Other objects of the invention will be made clear or become apparent from the following description and claims when read in light of the accompanying drawing, wherein:

Throughout this specification, reference may sometimes be made to a woodworking saw or to cutting of a wooden work piece. It is to be understood, however, that the saw of the present invention is in no way limited to use with wood and will find wide application to a variety of materials including wood, metal, rubber and plastic to name but a few.

Figure 1:
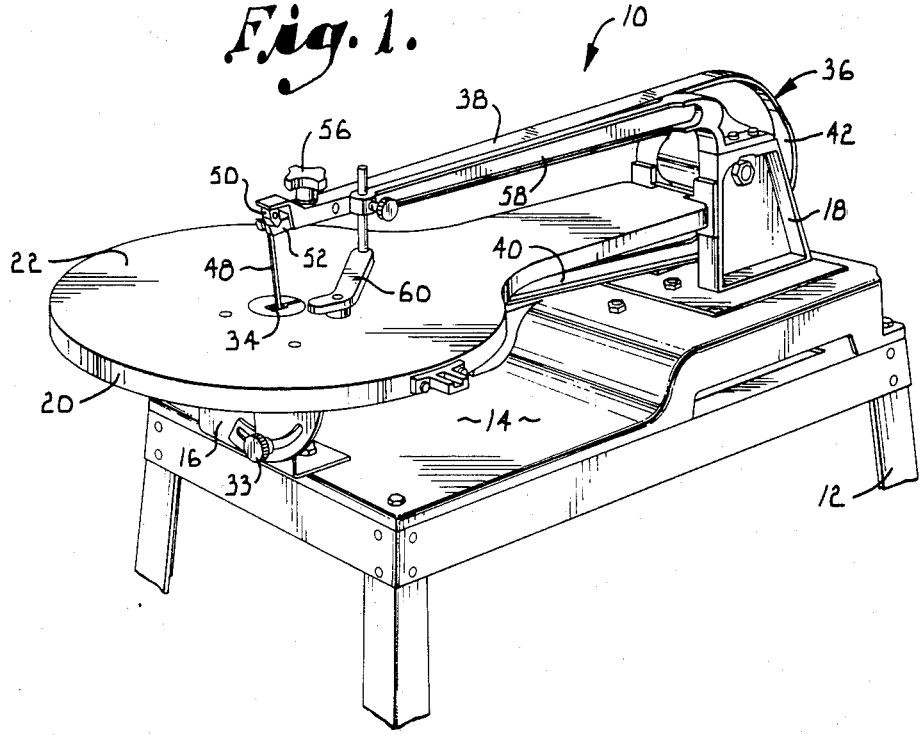
FIG. 1 is a perspective view of the precision saw according to the present invention.
Figure 2:
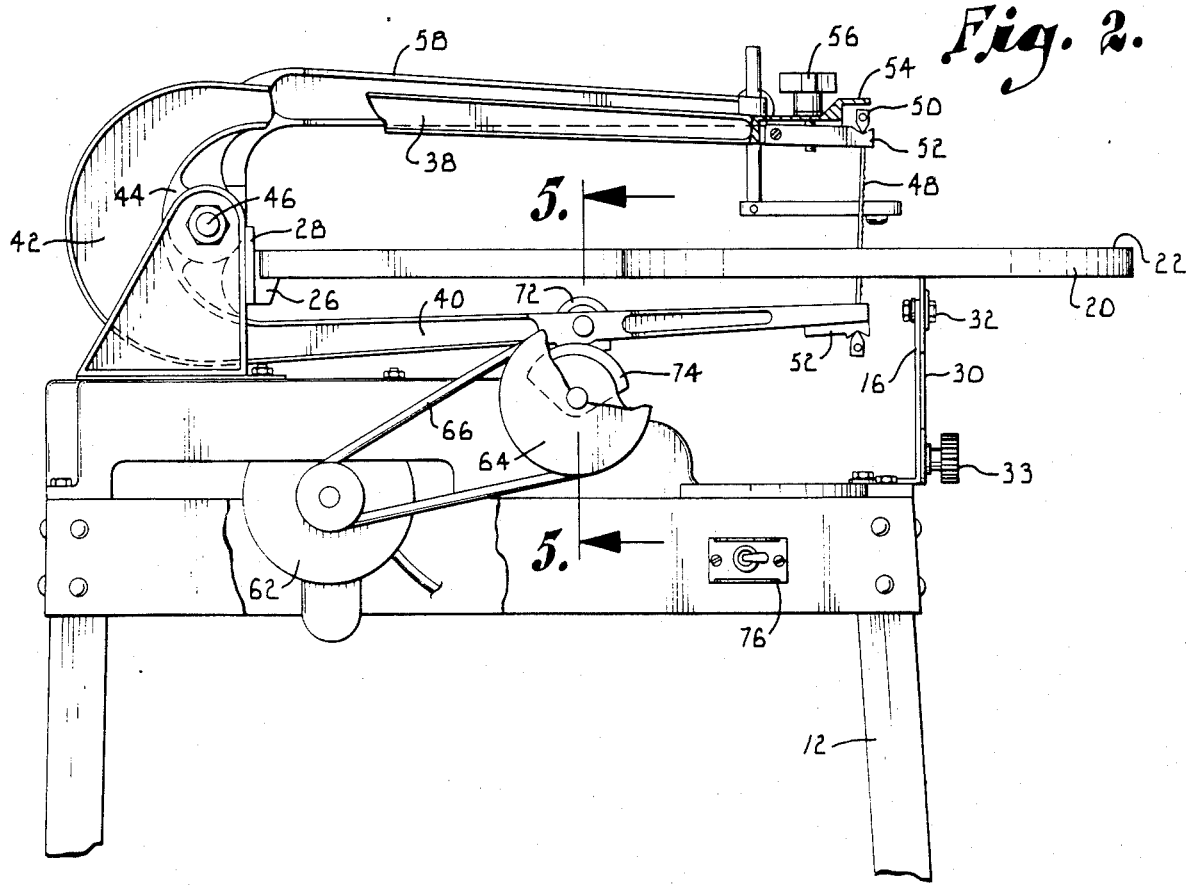
FIG. 2 is an enlarged side elevational view of the saw shown in FIG. 1.
Figure 3:
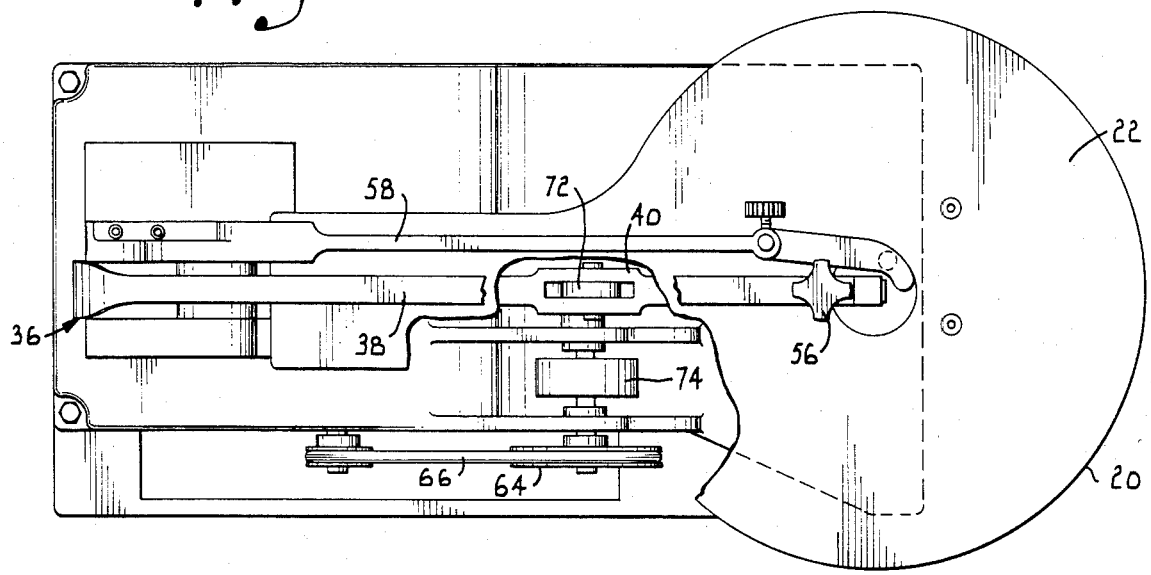
FIG. 3 is a top plan view of the saw shown in FIG. 2.
Figure 4:
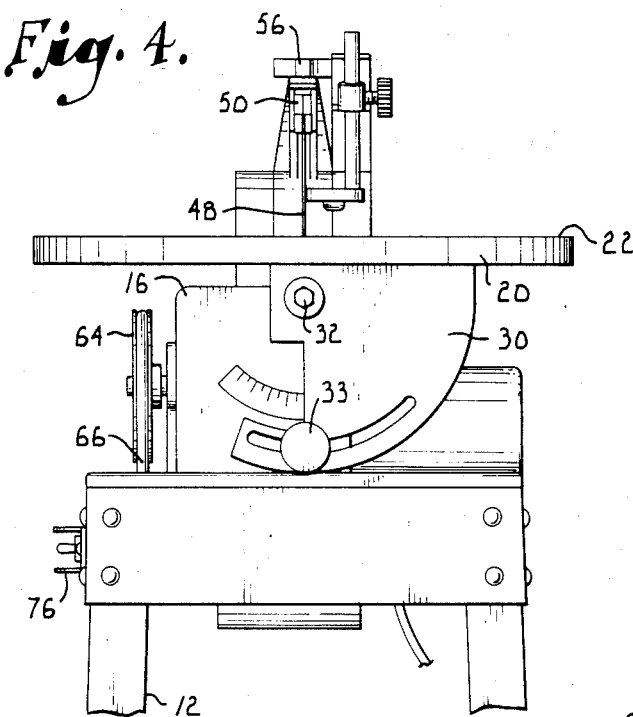
FIG. 4 is a front end elevational view.
Figure 5:
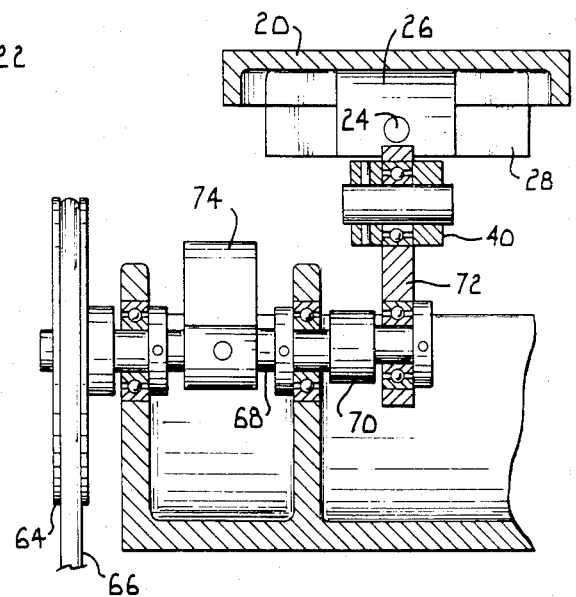
FIG. 5 is a vertical cross-sectional view taken along line 5—5 of FIG. 2.

Referring initially to FIG. 1, the saw of the present invention is designated generally by the numeral 10. A generally rectangular framework 12 has a top support 14 to which is secured an upright bracket 16 and two generally parallel spaced apart mounting plates 18. A planar member 20 presents a flat work surface 22 and is mounted at one end by a pin 24 passing through a depending mounting tab 26, rigid with planar member 20, and into a cross brace 28 that is rigid with mounting plates 18. The other end of member 20 is mounted on bracket 16 by a complemental depending bracket 30 rigid with member 20. A bolt 32 along with pin 24 provide pivot points so that planar member 20 may be moved through an angle of approximately 110 degrees. Knob 33 locks member 20 at any desired location. Member 20 has a blade opening 34 at approximately its center.

Figure 6:
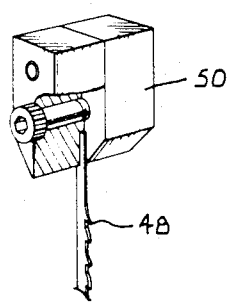
FIG. 6 is an enlarged fragmentary perspective view, partially in cross-section, of the means for holding the saw blade.

Disposed in transverse relationship to member 20 is a C-member 36 characterized by two parallel spaced-apart upper and lower arms 38 and 40 as well as a bight portion 42. It is to be noted that the cross-sectional dimension of bight portion 42 at its widest point is approximately twice the cross-sectional dimension of either of arms 38 or 40 at their widest point. At the midway point of bight portion 42, an ear 44 projects inwardly and is provided with an appropriate opening for receiving a pin 46 that pivotally mounts the C-member. Arms 38 and 40 extend forwardly from the bight portion 42 at least as far as opening 34 in member 20. Arms 38 and 40 receive a saw blade 48 that is held between two blade holders 50, one of which is shown in detail in FIG. 6. Blade holders 50 are in turn received by a seat 52 which extends from upper arm 38 and a corresponding inverted seat 52 mounted on lower arm 40. A keeper 54 mounted on upper arm 38 and movable via a control knob 56 holds blade 48 in position. Another arm 50 parallel to arm 38 mounts a movable foot 60 for holding a work piece during sawing.

A motor 62 is mounted on framework 12 and turns a drive pulley 64 through a belt 66. Pulley 64 in turn rotates a drive shaft 68 which in turn moves an eccentric drive arm 70 coupled with lower arm 40 through a drive linkage 72. A counterbalance 74 is also carried by shaft 68 to assure smooth operation of the eccentric drive. Motor 62 is electrically operated and is controlled at switch 76.

In operation, the motor is activated and a work piece to be cut is placed upon surface 22 of planar member 20. If desired, foot 60 can be utilized to hold the work piece in place. To this end, it will be appreciated that foot 60 can be adjusted vertically to accommodate materials of different thicknesses. Motor 62 drives lower arm 40 in a reciprocating manner through a vertical plane traversing the arm. Because lower arm 40 is integral with upper arm 38 and both arms are integral with bight portion 42, the arms will move in perfect synchronization about the single pivot point provided by pivot pin 46. It will be appreciated that an optional feature of the saw according to the present invention could be to provide a variable speed control on motor 62.

It is also to be understood that planar member 20 may be tilted in one direction or another to accommodate certain work pieces. To this end, knob 33 is simply loosened to permit the planar member to be tilted about pin 24 and bolt 32.

By making both of the arms integral and pivoting the arms about a single pivot point rather than having two separate pivot points, a novel construction is provided meeting all of the objectives of the invention heretofore set forth.

I claim:

1. A precision saw comprising:
   a framework;
   a pair of spaced apart, substantially parallel mounting plates rigidly connected with said framework and extending therefrom;
   a C-member having generally parallel upper and lower arms and a curved bight connecting said upper and lower arms, said arms and bight being integral;
   an ear integral with said bight and projecting from the concave side thereof, said ear fitting closely between said mounting plates;
   a substantially horizontal pivot pin extending through said ear and mounting plates to mount said C-member for pivotal movement about a horizontal pivot axis defined by said pivot pin;
   a saw blade extending between said upper and lower arms for cutting a work piece;
   power means for driving said C-member in reciprocating motion about said pivot pin to effect movement of the saw blade;
   a table presenting a planar work surface for feeding of the workpiece to the saw blade, said work surface having an opening for receiving the saw blade;
   a cross brace rigidly connected with said mounting plates and extending therebetween;
   means for connecting one end of said table to said cross brace for pivotal movement about a first pivot point;
   a bracket rigidly connected with said framework and extending therefrom, said bracket being spaced from said cross brace; and
   means for connecting said table to said bracket for pivotal movement about a second pivot point aligned with said first pivot point to establish a pivot axis about which said table can be tilted.

2. A precision saw as set forth in claim 1, wherein said power means includes:
   a motor;
   a generally horizontal shaft supported in said framework for rotation and driven by said motor;
   an eccentric drive arm coupled eccentrically at one end with said shaft and coupled at the other end with one arm of said C-member to thereby effect reciprocation of said C-member about said horizontal pivot axis upon actuation of said motor; and
   a counterbalance carried on said shaft and arranged to balance the shaft as same is rotated.

* * * * *